3,637,742
PYRROLIDINE COMPOUNDS WITH UNSATURATED SUBSTITUENT

Ian Moyle Lockhart, Egham, England, assignor to Parke, Davis & Company, Detroit, Mich.
No Drawing. Filed Jan. 26, 1970, Ser. No. 5,988
Claims priority, application Great Britain, Feb. 7, 1969, 6,880/69
Int. Cl. C07d 27/04
U.S. Cl. 260—326.5 M                 6 Claims

ABSTRACT OF THE DISCLOSURE m-(3-alkyl-3-pyrrolidinyl)phenol compounds substituted at the 1-position of the pyrrolidine ring by an unsaturated hydrocarbon or an unsaturated chlorohydrocarbon substituent; esters thereof; and salts of the foregoing compounds. These compounds are pharmacological agents and have analgesic and morphine antagonist properties. The phenols can be prepared by cleavage of the corresponding phenolic ethers or by reduction of a 1-(unsaturated acyl) derivative. The esters can be prepared by esterification of the phenols.

SUMMARY AND DETAILED DESCRIPTION

The present invention relates to new pyrrolidine compounds having an unsaturated hydrocarbon or an unsaturated chlorohydrocarbon substituent at the 1-position of the pyrrolidine ring. More particularly, the invention relates to new 1-substituted-3-(m-oxyphenyl)pyrrolidine compounds of the formula

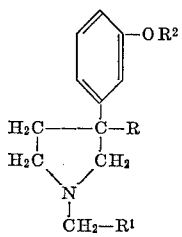

to salts thereof, and to methods for the production of the foregoing compounds; where R represents an alkyl radical containing from 1 to 5 carbon atoms inclusive; $R^1$ represents an alkenyl, ω-chloroalkenyl or ω,ω-dichloroalkenyl radical containing from 2 to 5 carbon atoms inclusive; and $R^2$ represents hydrogen or a group of the formula

where Y represents lower alkyl, cyclopropyl, or cyclobutyl. The term "lower alkyl," as used herein, denotes an alkyl radical of not more than 6 carbon atoms.

In accordance with the invention, the phenols of the invention, that is the compounds of the above formula wherein $R^2$ represents hydrogen, and salts thereof, can be produced by reacting a compound of the formula

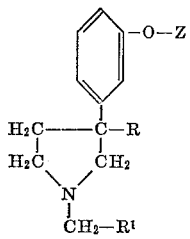

or a salt thereof with a reagent capable of cleaving the ether linkage; where R and $R^1$ are as defined before and Z represents a lower alkyl radical or a tetrahydropyranyl radical. The lower alkyl radicals represented by Z can optionally be substituted, in which case the nature of the substituent is relatively unimportant as the entire group is removed during the course of the reaction. A suitable reagent capable of cleaving the ether linkage is an acidic reagent. The treatment with an acidic reagent is followed, when necessary, by decomposition of an intermediate aluminum or boron complex which may be formed. Some examples of suitable acidic reagents are hydriodic acid, hydrobromic acid, hydrogen bromide in acetic acid, aluminum chloride in carbon disulfide, aluminum chloride in nitrobenzene, aluminum bromide in benzene, pyridine hydrochloride, and boron tribromide. When Z represents a lower alkyl radical, the preferred acidic reagent is 48% (constant boiling) hydrobromic acid, or boron tribromide. With hydrobromic acid, it is preferred to use a large excess of this reagent as a solvent. An additional solvent is not necessary and the reaction is commonly carried out for from 1 to 3 hours at the reflux temperature. In the case of other acidic reagents, the reaction conditions are modified as necessary. For example, in the case of boron tribromide, it is convenient to carry out the reaction in an unreactive solvent such as a hydrocarbon or a halogenated hydrocarbon for from 15 minutes to 12 hours at a temperature of approximately −70 to +50° C. It is preferable to conduct the reaction at about −60° C. while the reactants are being mixed and then allow the reaction mixture to warm to room temperature. The resulting product is formed as a boron complex which is then decomposed with a hydroxylic solvent such as methanol. When Z represents a tetrahydropyranyl radical, the preferred acidic reagent is a dilute mineral acid or formic acid. A specific acidic reagent in this case is sulfuric acid in aqueous ethanol. If desired, an additional solvent can be present such as a lower alkanol, acetone, tetrahydrofuran, ethylene glycol, or dioxane. The tetrahydropyranyl radical is relatively easy to remove and a reaction temperature of from 0 to 100° C. and a reaction time of from a few minutes to one hour are generally sufficient. In all of the above cases, the product can be isolated as an acid-addition salt, as the free base, or as a phenolate salt, following adjustment of the pH as required.

Starting materials required for use in the foregoing process can be prepared by any of a variety of methods. For example, a m-lower alkoxybenzyl cyanide is reacted with sodium amide and then with an alkyl halide containing from 1 to 5 carbon atoms inclusive, preferably an alkyl bromide or an alkyl iodide, to produce an α-alkyl-m-lower alkoxybenzyl cyanide of the formula

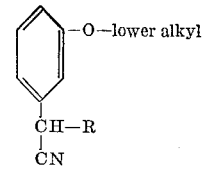

This compound is reacted with sodium amide and then with ethylene dichloride to give a chlorinated cyano intermediate having the formula

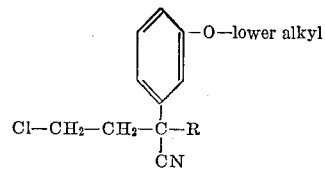

The latter product is cyclized by reaction with lithium aluminum hydride and the product hydrolyzed to give a compound of the formula

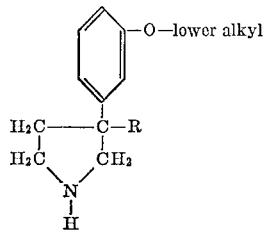

This compound is reacted with a halogen compound of the formula

X—CH$_2$—R$^1$ preferably in the presence of a base to produce a compound of the formula

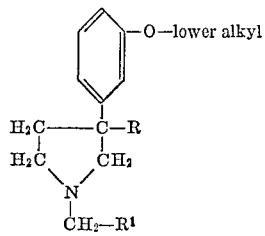

which is useful as a starting material in the foregoing process. In the above formulas R and R$^1$ are as defined before and X represents halogen, preferably bromine.

Starting materials wherein Z represents a tetrahydropyranyl radical can be prepared as follows. A 3-alkyl-3-m-lower alkoxyphenylpyrrolidine is reacted with acetic anhydride in acetic acid to produce the 1-acetyl derivative; and the phenolic ether group is converted to the free phenol by reaction with an acidic reagent capable of cleaving the ether linkage. This free phenol is reacted with 2,3-dihydropyran in the presence of a small quantity of mineral acid and the resulting 1-acetyl-3-alkyl-3-m-(tetrahydropyran - 2-yloxy)phenylpyrrolidine is hydrolyzed with potassium hydroxide in aqueous ethanol to produce a 3-alkyl-3-m-(tetrahydropyran-2-yloxy) phenylpyrrolidine. The latter compound is reacted with a halogen compound of the formula

X—CH$_2$—R$^1$ to introduce the group —CH$_2$—R$^1$ at the 1-position of the pyrrolidine ring; where R$^1$ and X are as defined before.

Also in accordance with the invention, the phenols of the invention, that is, the compounds of the first formula herein wherein R$^2$ represents hydrogen, and salts thereof, can be produced by reacting a compound of the formula

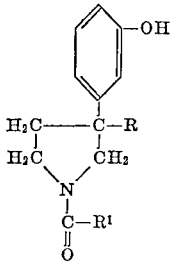

with a complex metal hydride reducing agent under anhydrous conditions, followed by hydrolyzing the product; where R and R$^1$ are as defined before. Some examples of suitable complex metal hydride reducing agents are lithium aluminum hydride and mixtures of lithium aluminum hydride and aluminum chloride. The preferred reducing agent is lithium aluminum hydride. Some examples of suitable solvents for the anhydrous stage of the process are ethers such as diethyl ether, tetrahydrofuran, dioxane, 1,2 - dimethoxyethane, and diethylene glycol diethyl ether. The time and temperature of the reaction are not critical. In general, the reaction is carried out at from about 0 to 100° C. or at the reflux temperature of the reaction mixture for from less than one hour to about 24 hours. Using ether as solvent, the reaction is substantially complete within 2 hours at the reflux temperature. While the reactants can be used in equivalent amounts, it is preferred to use a substantial excess of the complex metal hydride reduction agent. Following the anhydrous stage of the process, the reaction mixture is hydrolyzed with an aqueous medium such as water, a dilute aqueous acid, or a dilute aqueous base. The product can be isolated as an acid-addition salt, as the free base, or as a phenolate salt, following adjustment of the pH as required.

Starting materials to be used in the foregoing process can be prepared in any of various ways. For example, a 3-alkyl-3-m-lower alkoxylphenylpyrrolidine is reacted with an acid chloride of the formula

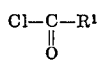

to introduce the group

at the 1-position of the pyrrolidine ring; where R$^1$ is as defined before. In place of the acid chloride, another acid halide or an acid anhydride can be used, if desired. The resulting product is then reacted with an acidic reagent to cleave the phenolic ether group and produce the free phenol to be used as a starting material. These procedures are illustrated in greater detail hereinafter.

Further in accordance with the invention, the esters of the invention, that is, the compounds of the formula

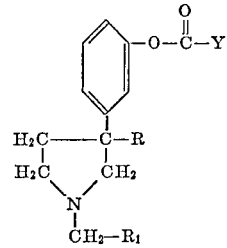

and salts thereof, can be produced by reacting a pyrrolidine compound of the formula

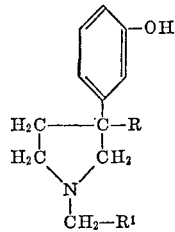

or a reactive derivative thereof, with a carboxylic acid of the formula

or a reactive derivative thereof; where R, R$^1$, and Y are as defined before. Some examples of suitable reactive derivatives of the pyrrolidine compound are the phenolate salts and acid-addition salts. Some examples of suitable reactive derivatives of the carboxylic acid are the acid halides and the acid anhydride. The acid anhydride can be used in combination with an alkali metal carboxylate. At least approximately the calculated amount and preferably an excess of the carboxylic acid or its reactive derivative is used. While the reaction can be run without an additional solvent, it is customary to employ an unreactive or compatible solvent. Some examples of suitable solvents are tertiary amines such as triethylamine, N,N-dimethylaniline, and pyridine; ethers such as diethyl ether and dioxane; hydrocarbons such as benzene and toluene; halogenated hydrocarbons such as ethylene chloride and chloroform; and tertiary amides such as dimethylformamide. Where an acid anhydride is a reactant, an excess of this reagent can be used as a solvent. The reaction is optionally conducted in the presence of an acidic or basic catalyst. When the reactant is a carboxylic acid, a suitable catalyst is a mineral acid. When the reactant is an acid anhydride or acid halide, a suitable catalyst is a tertiary amine. The time and temperature of the reaction are not critical but in general a higher temperature and a longer reaction time are used when a carboxylic acid is the reactant rather than one of its reactive derivatives. Depending on the particular reactants selected, the reaction can be carried out at a temperature from approximately 0 to 180° C. for from a few minutes to 48 hours. In the case of acid anhydrides the usual reaction conditions are 90–100° C. for 1 to 2 hours. The product is isolated either as the free base or as an acid-addition salt by adjustment of the pH as required.

The free bases of the invention form acid-addition salts with any of a variety of inorganic and organic acids. Pharmaceutically-acceptable acid-addition salts are formed by reaction with such acids as hydrochloric, hydrobromic, sulfuric, phosphoric, acetic, succinic, citric, maleic, and pamoic acids. The phenols of the invention also form phenolate salts with any of a variety of bases such as sodium hydroxide, potassium carbonate, and strongly-basic amines. The free bases and the salt forms are interconvertible by adjustment of the pH. They differ in solubility properties but in general are otherwise equivalent for the purposes of the invention. If desired, the compounds of the invention can also be obtained in optically active forms by using an optically active pyrrolidine derivative as starting material, or by resolving an optically inactive final product by fractional crystallization of a salt formed with an optically active acid.

The compounds of the invention are now chemical compounds useful as pharmacological agents and as chemical intermediates. They are of particular value as analgesic agents also exhibiting morphine antagonist properties. The analgesic activity of the compounds of the invention, in either free base or salt form, can be measured in standardized test procedures by administering a compound and observing the change in an animal's sensitivity to pain.

In one such procedure the analgesic activity of the compounds of the invention can be demonstrated and quantitatively determined by measuring the ability of a test compound to inhibit the abdominal constriction (writhing) that is observed in mice following intraperitoneal injection of acetylcholine, a known pain-producing substance. The method used has been described by Collier, et al., in the British Journal of Pharmacology and Chemotherapy, vol. 32, pages 295–310, February 1968. Albino mice (Tuck T/O strain or a similar strain) are first randomized into groups of 5, then injected subcutaneously with a measured dose of a test compound dissolved in 0.9% (weight/volume) sodium chloride solution. When the test compound is a free base, it is first solubilized in 1 N hydrochloric acid or in aqueous $d$-tartaric acid. Twenty minutes following administration of the test compound, 10 ml. per kg. body weight of a solution containing acetylchlorine bromide in 0.9% (weight/volume) sodium chloride solution is injected intraperitoneally. The dose of acetylcholine is selected to cause writhing in 90% or more of the control animals. Since the writhing response to acetylcholine occurs very quickly and declines after 2 minutes, the mice are next placed in a plastic box and observed for 2 minutes, by an observer who is unaware of the drug treatment given, to determine the number of mice writhing within that period. By means of graded doses, the dose of test compound that inhibits writhing in 50% of the animals ($ED_{50}$) is determined. The mice are also tested for discoordination by the rotating drum method described in Analyst, vol. 74, pages 592–596 (1949). The dose that discoordinates 50% of the mice ($FD_{50}$) can also be determined. Known analgesic agents give an $ED_{50}$ value of less than 100 mg./kg. and an $FD_{50}/ED_{50}$ ratio greater thtn 4. To eliminate false positive results that may be obtained with test compounds that are anticholinergic agents, each test compound found to be sufficiently active in the writhing test is also tested for absence of anticholinergic activity by observing its inability to protect mice from physostigmine toxicity. In the writhing test described above, the analgesic activities ($ED_{50}$) of representative preferred compounds of the invention were determined as follows: m-(1-allyl-3-isobutyl-3-pyrrolidinyl)phenol, 0.35 mg./kg.; m-(1-allyl-3-neopentyl-3-pyrrolidinyl)phenol, 0.47 mg./kg. The compounds of the invention also meet the other criteria for analgesic agents as described above.

The morphine antagonist activity of the compounds of the invention can be determined in a procedure designed to measure the ability of a test compound to block the pain-relieving effect of morphine in mice subjected to pain from the pressure of an artery clip applied to the tail. (See Bianchi, C. and Franceschini, J., British Journal of Pharmacology and Chemotherapy, vol. 9, pages 280–284, 1954; and Collier, H.O.J., Evaluation of Drug Activities: Pharmacometrics, ed. Lawrence, D. R. and Bacharach, A. L., London: Academic Press, 1964, pages 183–203.) Albino mice (Tuck T/O strain or a similar strain) are randomized into groups of 10 and tested for a normal response to an artery clip of 250–300 g. opening tension placed for up to 10 seconds at the root of the tail. The mice that turn and bite the clip or squeak within 10 seconds are used in the test. Each mouse is injected subcutaneously with a measured dose of test compound (solubilized with dilute hydrochloric acid or with $d$-tartaric acid, if necessary), dissolved in 0.9% (weight/volume) sodium chloride solution that also contains a dose of morphine sulfate (22.2 mg. base/kg.) sufficient to suppress response to the artery clip in 95% of the animals in the absence of a test compound. Control groups receiving only the test compound, and only morphine sulfate, are also used. Twenty minutes after injection, each mouse is challenged with the artery clip for up to 10 seconds, and the mice not responding are counted. By means of graded doses, the quantity of test compound antagonizing or overcoming the effect of morphine in 50% of the mice ($AD_{50}$) is determined. For representative preferred compounds of the invention, the morphine antagonist activities ($AD_{50}$) were determined as follows: m-(1-allyl-3-isobutyl-3-pyrrolidinyl)phenol, 1.5 mg./kg.; m - (1-allyl-3-neopentyl-3-pyrrolidinyl)phenol, 1.6 mg./kg.

As indicated above, the compounds of the invention are active parenterally, and they are also active on oral administration.

The invention is illustrated by the following examples.

EXAMPLE 1

An ether solution of 13.7 g. of 1-allyl-3-isobutyl-3-m-methoxyphenylpyrrolidine is treated with excess hydrogen chloride in ether and concentrated to dryness. The residue is dissolved in 50 ml. of methylene chloride and treated with 10 ml. of boron tribromide added dropwise while the reaction temperature is maintained at —60 C. or below with external cooling. The mixture is then allowed to warm to room temperature, stirred for 45 minutes, cooled to —30° C., diluted with 50 ml. of methanol, concentrated to a small volume, and diluted with excess 2 N sodium hydroxide solution. The methylene chloride layer is removed. The aqueous phase is treated with concentrated aqueous ammonia and the resulting mixture extracted with methylene chloride. The extracts are washed with water, dried over anhydrous sodium sulfate, and concentrated to dryness to give a residue of m-(1-allyl-3- isobutyl-3-pyrrolidinyl)phenol. For purification, the product is distilled in vacuo; B.P. 147–155° C. at 0.3–0.4 mm. The free base forms hydrochloride and citrate salts by reaction with hydrogen chloride in ether and with citric acid in methanol.

The following additional products are obtained by using a different 1 - substituted-3-alkyl-3-m-methoxyphenyl-pyrrolidine for the allyl-3-isobutyl-3-m-methoxyphenylpyrrolidine in the foregoing procedure.

From 1 - allyl-3-methyl-3-m-methoxyphenylpyrrolidine, the product is m-(1-allyl-3-methyl-3-pyrrolidinyl)phenol; B.P. 151–154° C. at 0.8 mm.

From 1-allyl-3-ethyl-3-m-methoxyphenylpyrrolidine, the product is m - (1-allyl-3-ethyl-3-pyrrolidinyl)phenol; B.P. 141–143° C. at 0.2 mm. The hydrochloride is obtained by dissolving the free base in ether and adding hydrogen chloride to precipitate the product; M.P. 149–150° C. following crystallization from ethanol-ether.

From 1 - allyl - 3 - sec-butyl-3-m-methoxyphenylpyrrolidine, the product is m-(1-allyl-3-sec-butyl-3-pyrrolidinyl)-phenol; B.P. 155° C. at 0.5 mm.

From 1 - allyl-3-neopentyl-3-m - methoxyphenylpyrrolidine, the product is m-(1-allyl-3-sec-butyl-3-pyrrolidinyl)-phenol; B.P. 166–168° C. at 0.6 mm. The free base forms hydrochloride and $d$-tartrate salts by reaction with hydrogen chloride in ether and with $d$-tartaric acid in water.

From 1-(3-chloroallyl)-3-isobutyl-3-m-methoxyphenylpyrrolidine, the product is m-[1-(3-chloroallyl)-3-isobutyl-3-pyrrolidinyl]phenol; B.P. 176–178° C. at 0.5 mm.

From 1-(3,3-dichloro-2-methylallyl) - 3 - isobutyl-3-m-methoxyphenylpyrrolidine, the product is m-[1-(3,3-dichloro-2-methylallyl) - 3 - isobutyl-3-pyrrolidinyl]phenol. This compound has M.P. 82–83.5° C.

From 1-(3-hexenyl)-3-isobutyl-3-m-methoxyphenyl-pyrrolidine, the product is m-[1-(3-hexenyl)-3-isobutyl-3-pyrrolidinyl]phenol; B.P. 178–181° C. at 0.3 mm.

EXAMPLE 2

A mixture of 5.4 g. of 1-allyl-3-m-isopropoxy-phenyl-3-propylpyrrolidine and 50 ml. of 6 N hydrochloric acid is heated at reflux for 4 hours, cooled, diluted with 100 ml. of water, and made basic with concentrated aqueous ammonia. The mixture is extracted with methylene chloride and the extracts are dried over anhydrous magnesium sulfate and concentrated to dryness to give a residue of m - (1 - allyl-3-propyl-3-pyrrolidinyl)phenol. For purification, the product is distilled in vacuo; B.P. 152–155° C. at 0.5 mm. The hydrochloride is obtained by dissolving the free base in ether and adding hydrogen chloride; M.P. 152–153° C. following crystallization from isopropyl alcohol-ether. A salt with $d$-tartaric acid is obtained by dissolving one equivalent of the free base and one equivalent of $d$-tartaric acid in water and evaporating the solution. A salt with citric acid is obtained in the same manner from the free base and citric acid. Sodium, potassium, and choline salts are obtained by reacting the free base (free phenol) with sodium hydroxide, with potassium hydroxide, and with choline.

EXAMPLE 3

A solution of 25 g. of 1-allyl-3-isopropyl-3-m-methoxyphenylpyrrolidine and 87 ml. of 48% hydrobromic acid is heated at reflux for 3 hours and concentrated almost to dryness by distillation. The residual material is heated for 10 minutes with excess concentrated aqueous ammonia and the resulting mixture is diluted with 250 ml. of water and extracted with chloroform. The extracts are washed with water, dried over anhydrous magnesium sulfate, and evaporated to dryness to give a residue of m-(1-allyl-3-isopropyl-3-pyrrolidinyl)phenol. For purification, the product is distilled in vacuo; B.P. 165–168° C. at 0.8 mm. The hydrochloride is obtained by dissolving the free base in ether and adding hydrogen chloride; M.P. 162–163° C.

In the same manner, from 29 g. of 1-allyl-3-isobutyl-3-m-methoxyphenylpyrrolidine and 87 ml. of 48% hydrobromic acid, the product is m-(1-allyl-3-isobutyl-3-pyrrolidinyl)phenol; B.P. 147–155° C. at 0.3–0.4 mm.

EXAMPLE 4

A mixture of 5.1 g. of 3-isobutyl-1-(2-methylallyl)-3-m-(tetrahydropyran-2-yloxy)phenylpyrrolidine, 50 ml. of 2 N sulfuric acid, and 10 ml. of ethanol is heated for one-half hour at 40° C., concentrated to remove ethanol, diluted with 100 ml. of water, and poured into excess 5 N sodium hydroxide. This mixture is saturated with carbon dioxide and extracted with chloroform. The chloroform extract is washed with water, dried over anhydrous sodium sulfate, and evaporated to give a residue of m-[3-isobutyl-1-(2-methylallyl)-3-pyrrolidinyl]phenol. For purification, the product is distilled in vacuo; B.P. 150–152° C. at 0.2 mm.

By the foregoing procedure, with the substitution of an equivalent amount of 1-(2-butenyl)-3-isobutyl-3-m-(tetrahydropyran-2-ylxoy)phenylpyrrolidine for the 3-isobutyl-1-(2-methylallyl)-3-m-(tetrahydropyran-2-yloxy)-phenylpyrrolidine, the product is m-[1-(2-butenyl)-3-isobutyl-3-pyrrolidinyl]phenol; B.P. 170–174° C. at 0.4 mm.

EXAMPLE 5

With stirring, 5.7 g. of m-[1-(3-methylcrotonoyl)-3-isobutyl-3-pyrrolidinyl]phenol in 50 ml. of ether is added to a suspension of 2.5 g. of lithium aluminum hydride and 50 ml. of ether. The resulting mixture is heated at reflux for 3 hours, cautiously hydrolyzed with 25 ml. of saturated ammonium chloride solution, and filtered. The filtrate is extracted with 2 N hydrochloric acid. The acidic extract is made basic with 6 N aqueous ammonia and extracted with ether. The ether extract is dried over anhydrous sodium sulfate and evaporated to give a residue of m-[3-isobutyl-1-(3-methyl-2-butenyl)-3-pyrrolidinyl]phenol. For purification, the product is distilled in vacuo; B.P. 160–162° C. at 0.15 mm.

Similarly, from m-[1-(3-methylcrotonoyl)-3-propyl-3-pyrrolidinyl]phenol, the product obtained is m-[1-(3-methyl-2-butenyl)-3-propyl-3-pyrrolidinyl]phenol; B.P. 145–150° C. at 0.15 mm.

Similarly, but using tetrahydrofuran in place of ether as a solvent, the product obtained from m-[3-isobutyl-1-(2-methylcrotonoyl) - 3 - pyrrolidinyl]phenol is m-[3-isobutyl-1-(2-methyl-2-butenyl)-3-pyrrolidinyl]phenol; B.P. 162–164° C. at 0.5 mm.

EXAMPLE 6

A mixture of 5.2 g. of m-(1-allyl-3-isobutyl-3-pyrrolidinyl)phenol, 50 ml. of acetic anhydride, and 50 ml. of pyridine is heated at 95° C. for 2 hours and then allowed to stand at room temperature for 16 hours. The mixture is concentrated almost to dryness and the residue stirred with xylene. The xylene is removed by vacuum distillation to give a residue of m-(1-allyl-3-isobutyl-3-pyrrolidinyl)phenol, acetate ester.

EXAMPLE 7

A mixture of 2.6 g. of m-(1-allyl-3-isobutyl-3-pyrrolidinyl)phenol, 2.5 ml. of triethylamine, and 25 ml. of methylene chloride is treated dropwise at 5° C. with a solution of 1.0 g. of cyclopropanecarbonyl chloride in 10 ml. of methylene chloride. The mixture is stirred for 2½ hours, allowed to warm to room temperature, and poured into excess 2 N sodium carbonate solution. The organic phase is separated and washed twice with 2 N sodium carbonate solution and then with several portions of water. The organic phase is dried over anhydrous magnesium sulfate, filtered, and evaporated to give a residue of m-(1-allyl-3-isobutyl-3-pyrrolidinyl)phenol, cyclopropanecarboxylate ester.

Similarly, the substituting an equivalent amount of cyclobutanecarbonyl chloride for the cyclopropane carbonyl chloride, the product obtained is m-(1-allyl-3-isobutyl-3-pyrrolidinyl)phenol, cyclobutanecarboxylate ester.

Similarly, by substituting an equivalent amount of m-(1-allyl-3-neopentyl-3-pyrrolidinyl)phenol for the m-(1-allyl-3-isobutyl-3-pyrrolidinyl)phenol, and an equivalent amount of isobutyryl chloride for the cyclopropane carbonyl chloride, the product obtained is m-(1-allyl-3-neopentyl-3-pyrrolidinyl)phenol, isobutyrate ester.

Starting materials

A stirred suspension of 15.6 g. of sodium amide in 300 ml. of dry benzene is cooled to 5° C. while 58.8 g. of m-methoxybenzyl cyanide is added, the resulting mixture is stirred at 5° C. for 90 minutes, and it is then treated dropwise with 73.8 g. of isopropyl bromide while the temperature is kept below 5° C. The reaction mixture is allowed to warm to 20° C., and is then heated under reflux for 2 hours. Upon cooling, it is washed with two 200-ml. portions of water, with 100 ml. of 2 N hydrochloric acid, and with 200 ml. more of water, and is dried. The dried solution is evaporated, and the residue is distilled to give α-isopropyl-m-methoxybenzyl cyanide; B.P. 98–104° C. (0.3–0.4 mm.). This intermediate product (62 g.) is added to a stirred suspension of 12.8 g. of sodium amide in 170 ml. of dry benzene kept at 5° C., and the resulting mixture is heated under reflux for 3 hours. It is then cooled again to 5° C. while 100 ml. of ethylene dichloride is added, and this new reaction mixture is allowed to warm to room temperature and is heated under reflux for 3 hours. Upon cooling, it is washed with 250 ml. of water, with 100 ml. of 2 N hydrochloric acid, and with 200 ml. more of water, dried, evaporated, and the residue distilled to give 1-chloro-3-m-methoxyphenyl - 3 - cyano-4-methylpentane; B.P. 136–140° C. (0.8 mm.). This second intermediate product (19.3 g.) is dissolved in 100 ml. of anhydrous ether, and the ethereal solution is added to a stirred suspension of 5.0 g. of lithium aluminum hydride in 150 ml. of anhydrous ether in such manner so as to maintain gentle reflux. The mixture is then heated under reflux for 5 hours, kept at room temperature overnight, and cautiously treated with 10 ml. of water and 15 ml. of 2 N sodium hydroxide. The aqueous mixture is heated under reflux for one hour, cooled, and filtered. The ethereal phase is separated, dried, and distilled to give 3-isopropyl-3-m - methoxyphenylpyrrolidine; B.P. 114–122° C. (0.5 mm.).

By the foregoing general procedure, starting from m-methoxybenzyl cyanide and an alkyl halide, the following are illustrations of other products obtained. 3-isobutyl-3-m-methoxyphenylpyrrolidine, B.P. 120–124° C. (1.0 mm.), is prepared from 1-chloro-3-cyano-3-m-methoxyphenyl-5-methylhexane, B.P. 120–125° C. (0.4–0.5 mm.), which is in turn prepared from α-isobutyl-m-methoxybenzyl cyanide, B.P. 117–122° C. (0.8 mm.). 3-sec-butyl-3-m - methoxyphenylpyrrolidine, B.P. 122–124° C. (0.5 mm.), is prepared from 1-chloro-3-cyano-3-m-methoxyphenyl-4-methylhexane, B.P. 115–120° C. (0.2 mm.), prepared in turn from α-sec-butyl-m-methoxybenzyl cyanide, B.P. 102–104° C. (0.2 mm.). 3-neopentyl-3-m-methoxyphenylpyrrolidine, B.P. 128–130° C. (0.7 mm.), is prepared from 1-chloro-3-cyano-3-m-methoxyphenyl-5,5-dimethylhexane, M.P. 84–85° C. following crystallization from petroleum ether, prepared in turn from α-neopentyl-m-methoxybenzyl cyanide, B.P. 108–117° C. (0.25–0.45 mm.). 3-m-methoxyphenyl-3-methylpyrrolidine, B.P. 108–112° C. (1.0 mm.), is prepared from 1-chloro-3-cyano-3-m-methoxyphenylbutane, B.P. 122–135° C. (1.5–1.8 mm.), prepared in turn from α-methyl-m-methoxybenzyl cyanide, B.P. 94–96° C. (0.7 mm.).

A mixture of 17 g. of 3-isobutyl-3-m-methoxyphenylpyrrolidine, 10 g. of sodium bicarbonate, and 100 ml. of dimethylformamide is treated with 12 g. of allyl bromide. The mixture is stirred for 18 hours at 50° C., concentrated to one-half its original volume, and filtered. The filtrate is diluted with 250 ml. of water, extracted with ether, and made distinctly basic with 2 N sodium hydroxide. The basic mixture is extracted with chloroform and the chloroform extract is washed with water, dried over anhydrous sodium sulfate, evaporated, and distilled in vacuo. The product, 1-allyl-3-isobutyl-3-m-methoxyphenylpyrrolidine, is collected as a distillate; B.P. 170–175° C. (2.5 mm.). Similarly, from 3-m-methoxyphenyl-3-methylpyrrolidine and allyl bromide, the product is 1-allyl-3-m-methoxyphenyl-3-methylpyrrolidine; B.P. 115–118° C. (0.3 mm.). Similarly, from 3-ethyl-3-m-methoxyphenylpyrrolidine and allyl bromide, the product is 1-allyl - 3 - ethyl-3-m-methoxyphenylpyrrolidine; B.P. 138–142° C. (1.5 mm.). Similarly, from 3-sec-butyl-3-m-methoxyphenylpyrrolidine and allyl bromide, the product is 1 - allyl-3-sec-butyl-3-m-methoxyphenylpyrrolidine; B.P. 162° C. (2.5 mm.). Similarly, from 3-neopentyl-3-m-methoxyphenylpyrrolidine and allyl bromide, the product is 1 - allyl-3-neopentyl-3-m-methoxyphenylpyrrolidine; B.P. 126–128° C. (0.1 mm.). Similarly, from 3-isobutyl-3-m-methoxyphenylpyrrolidine and 3-chloroallyl bromide, the product is 1-(3-chloroallyl) - 3 - isobutyl-3-m-methoxyphenylpyrrolidine; B.P. 146–148° C. (0.3 mm.). Similarly, from 3-isobutyl-3-m-methoxyphenylpyrrolidine and 3,3-dichloro-2-methylallyl bromide, the product is 1 - (3,3-dichloro-2-methylallyl)-3-isobutyl-3 - m - methoxyphenylpyrrolidine; B.P. 177–178° C. (0.7 mm.). Similarly, from 3-isobutyl-3-m-methoxyphenylpyrrolidine and 3-hexenyl bromide, the product is 1-(3-hexenyl)-3-isobutyl-3-m-methoxyphenylpyrrolidine; B.P. 154–158° C. (0.3 mm.). Similarly, from 3 - isopropyl-3-m-methoxyphenylpyrrolidine and allyl bromide, the product is 1-allyl-3-isopropyl-3-m-methoxyphenylpyrrolidine; B.P. 128–141° C. (0.7–1.5 mm.). Similarly, from 3-isobutyl-3-m-(tetrahydropyran-2-yloxy)phenylpyrrolidine and 2-methylallyl bromide, the product is 3-isobutyl-1-(2-methylallyl)-3-m-(tetrahydropyran - 2 - yloxy)phenylpyrrolidine. Similarly, from 3-isobutyl-3-m-(tetrahydropyran-2-yloxy)phenylpyrrolidine and 2-butenyl bromide, the product is 1-(2-butenyl)-3-isobutyl - 3 - m - (tetrahydropyran-2-yloxy)phenylpyrrolidine. Similarly, from 3-m-isopropoxyphenyl-3-propylpyrrolidine and allyl bromide, but using methyl ethyl ketone as solvent in place of dimethylformamide and heating at reflux for 4 hours, the product is 1-allyl-3-m-isopropoxyphenyl-3-propylpyrrolidine.

To a solution of sodium methoxide, prepared from 46 g. of sodium and 600 ml. of methanol, is added a solution of 248 g. of m-hydroxybenzaldehyde in 400 ml. of methanol, and the resulting mixture is in turn added to a cooled, stirred suspension of 36 g. of potassium borohydride in 280 ml. of methanol. The mixture is stirred at room temperature for 18 hours, heated under reflux for 2 hours, and then cooled to 0° C. while 36 g. of isopropyl bromide is added. This reaction mixture is heated under reflux for 6 hours and evaporated to remove solvent. The residue is dissolved in water, the aqueous solution is extracted with ether, and the ether extract is dried and distilled to give m-isopropoxybenzyl alcohol, B.P. 105° C. (1 mm.).

To a stirred mixture consisting of 270 g. of m-isopropoxybenzyl alcohol, 158 g. of pyrridine, and 260 ml. of ether, cooled to 0–5° C., is added in a dropwise manner 250 g. of thionyl chloride. The mixture is then evaporated to remove ether, and the residue is heated under reflux for 90 minutes, cooled, and poured into 2 liters of ice water. The resulting aqueous mixture is extracted with ether, and the ether extracts are washed with water, dried, and distilled to give m-isopropoxybenzyl chloride, B.P. 96° C. (1.5 mm.).

A mixture consisting of 257 g. of m-isopropoxybenzyl chloride, 260 g. of potassium cyanide, 38.5 g. of potassium iodide, 270 ml. of ethyl alcohol, and 180 ml. of water is heated under reflux for 8 hours, cooled, filtered, and the filtrate evaporated to remove ethanol. The residue is treated with 200 ml. of water, the aqueous solution is extracted with ether, and the ether extracts are dried and distilled to give m-isopropoxybenzyl cyanide, B.P. 130–134° C. (1.7 mm.).

A mixture of 720 g. of m-isopropoxybenzyl cyanide, 49 g. of sodium amide, and 300 ml. of dry ether is heated under reflux for two hours and then cooled to 10–20° C. while 155 g. of n-propyl bromide is added. The reaction mixture is then stirred at room temperature for 20 hours, treated with 250 ml. of water, and the ethereal phase is separated and set aside. The aqueous phase is extracted with ether, the extracts are combined with the separated ethereal phase, and the combined ethereal solution is dried and distilled to give α-propyl-m-isopropoxybenzyl cyanide, B.P. 120–124° C. (0.45 mm.). This intermediate (117 g.) is added to a suspension of 21 g. of sodium amide in 560 ml. of ether, the mixture is stirred and heated under reflux for 3 hours, it is then cooled to 0–10° C. while 117 g. of 2-bromoacetal is added, and the new mixture is stirred at room temperature for 18 hours and then treated with 200 ml. of water. The ethereal phase is separated and set aside, and the aqueous layer is extracted with ether. The extracts are combined with the separated ethereal phase, and the combined ethereal solution is dried and distilled to give 1,1-diethoxy-3-m-isopropoxyphenyl-3-cyanohexane, B.P. 140–160° C. (0.4 mm.).

A mixture consisting of 85.5 g. of 1,1-diethoxy-3-m-isopropoxyphenyl-3-cyanohexane, 30 g. of 10% palladium on charcoal, 1140 ml. of absolute ethanol, and 125 ml. of 25% sulfuric acid is shaken with hydrogen at 500 pounds per square inch at 60–80° C. for 24 hours. The mixture is filtered, the filtrate is evaporated, and the residue is dissolved in 1000 ml. of water. The aqueous solution is washed with ether, made alkaline with 10 N sodium hydroxide, and the alkaline mixture is extracted with ether. The ether extracts are dried and distilled to give 3-m-isopropoxyphenyl - 3 - propylpyrrolidine, B.P. 138–146° C. (0.45 mm.).

A solution of 33 g. of 3-isobutyl-3-m-methoxyphenyl-pyrrolidine, 70 ml. of acetic acid, and 70 ml. of acetic anhydride is heated at reflux for 1½ hours and then concentrated under reduced pressure to give a residue of 1 - acetyl-3-isobutyl-3-m-methoxyphenylpyrrolidine, suitable for use without further purification. This product is converted to m-(1-acetyl-3-isobutyl-3-pyrrolidinyl)-phenol, M.P. 124–126° C. following crystallization from benzene-petroleum ether, by reaction with boron tribromide at −60° C. or below followed by decomposition of the intermediate boron complex with methanol, and basification of the mixture, essentially as described in Example 1 herein. A solution of 20.5 g. of m-(1-acetyl-3-isobutyl-3-pyrrolidinyl)phenol, 75 ml. of 2,3-dihydropyran, and 0.5 ml. of concentrated hydrochloric acid is stirred one hour at 50° C. and then 18 hours at room temperature. This mixture is concentrated to dryness and the residue dissolved in 200 ml. of ether. The ether solution is washed with 2 N sodium hydroxide solution and with water, dried over anhydrous sodium sulfate, and evaporated to give a residue of 1-acetyl-3-isobutyl-3-m-(tetrahydropyran-2-yloxy)phenylpyrrolidine. A mixture of 28.5 g. of this product, 150 g. of potassium hydroxide, 150 ml. of ethanol, and 150 ml. of water is heated at reflux for 24 hours, concentrated to remove the ethanol, and diluted with 300 ml. of water. The diluted mixture is extracted with ether and the ether extract is washed with water, dried over anhydrous sodium sulfate, and evaporated to give a residue of 3-isobutyl-3-m-(tetrahydropyran-2-yloxy)phenylpyrrolidine. For purification the product is distilled in vacuo; B.P. 164–170° C. (0.2 mm.).

With stirring at 70° C., 8.0 g. of 3-methylcrotonoyl chloride is added dropwise to a mixture of 15.0 g. of 3-isobutyl-3-m-methoxyphenylpyrrolidine, 12.5 g. of anhydrous potassium carbonate, and 150 ml. of dimethylformamide. The mixture is heated for 4 hours at 80° C. and filtered. The filtrate is evaporated and the residue is dissolved in 200 ml. of chloroform. The chloroform solution is washed with 2 N hydrochloric acid and with water, dried over anhydrous sodium sulfate, and evaporated to give an oily residue of 3-isobutyl-3-m-methoxyphenyl-1-(3-methylcrotonoyl)pyrrolidine, suitable for use without further purification. A solution of 10 g. of this product and 50 ml. of methylene chloride is added dropwise to a mixture of 9 ml. of boron tribromide and 50 ml. of methylene chloride maintained below −60° C. The mixture is allowed to warm to room temperature, stirred for 1½ hours, cooled to −60° C., and treated with 20 ml. of methanol. The mixture is evaporated and the residue partitioned between dilute sodium hydroxide solution and methylene chloride. The aqueous phase is separated, treated with excess carbon dioxide, and extracted with methylene chloride. This methylene chloride extract is washed with water, dried over anhydrous sodium sulfate, and concentrated to dryness to give a residue of m-[1-(3-methylcrotonoyl) - 3-isobutyl-3-pyrrolidinyl]phenol, suitable for use without further purification. Similarly, from 3-m-methoxyphenyl-1 - (3-methylcrotonoyl)-3-propylpyrrolidine, the product obtained is m-[1-(3-methylcrotonoyl)-3-propyl-3-pyrrolidinyl]phenol. Similarly, from 3-isobutyl-3-m-methoxyphenyl - 1 - (2-methylcrotonoyl)pyrrolidine, the product obtained is m-[3-isobutyl-1-(2-methylcrotonoyl)-3-pyrrolidinyl]phenol.

With stirring, 26.0 g. of 3-methylcrotonoyl chloride is added to a solution of 45.0 of 3-m-methoxyphenyl-3-propylpyrrolidine in 180 ml. of triethylamine maintained below 0° C. The mixture is stirred an additional 2 hours, allowed to warm to room temperature, and concentrated to dryness. The residue is dissolved in methylene chloride and the solution washed with 2 N hydrochloride acid, with 2 N sodium carbonate, and with saturated sodium chloride solutions. The methylene chloride phase is then evaporated to give an oily residue of 3-m-methoxyphenyl-1-(3 - methylcrotonoyl)-3-propylpyrrolidine. Similarly, from 3-isobutyl - 3 - m-methoxyphenylpyrrolidine and 2-methylcrotonoyl chloride, the product obtained is 3-isobutyl-3-m-methoxyphenyl-1-(2 - methylcrotonoyl)pyrrolidine.

Resolution of optical isomers

A solution of 64 g. of (−)-di-(p-toluoyl)-D-tartaric acid in 620 ml. of ethanol is added to a solution of 42.5 g. of m-(1-allyl-3-isobutyl-3-pyrrolidinyl)phenol (as prepared according to Example 1 or Example 3) in 620 ml. of ethanol, and the mixture cooled to 2° C. The crystalline salt which separates is collected on a filter and recrystallized several times from absolute ethanol. The product is shaken with 6 N aqueous ammonia and the resulting free base extracted with ether. The ether extract is washed with 6 N aqueous ammonia and with water, dried over magnesium sulfate, and evaporated to give a residue of the levorotatory isomer of m-(1-allyl-3-isobutyl-3-pyrrolidinyl)phenol; B.P. 166° C. (1.0 mm.); M.P. 52–54° C.; $[\alpha]_D^{24}$ −26.8° in ethanol (1.013 g./100 ml.). The hydrochloride is obtained by dissolving the levorotatory free base in ethanol, adding ethanolic hydrogen chloride, and evaporating the solution. Following crystallization from isopropyl alcohol, it has M.P. 149.5–150° C.; $[\alpha]_D^{23}$ −10.0° in ethanol (1.028 g./100 ml.).

The ethanolic liquor from the original salt formation with (−)-di-(p-toluoyl)-D-tartaric acid is evaporated and the enriched dextrorotory base liberated from the salt by treatment with aqueous ammonia as described above. A solution of 15.8 g. of this free base in 230 ml. of ethanol is treated with a solution of 23.5 g. of (+)-di-(p-toluoyl)-L-tartaric acid in 230 ml. of ethanol and the mixture cooled to 2° C. and allowed to stand. The crystalline salt is collected on a filter, recrystallized from absolute ethanol, and treated with 6 N aqueous ammonia to liberate the free base as described above. The product obtained is the dextrorotatory isomer of m-(1-allyl-3-isobutyl - 3 - pyrrolidinyl)phenol; B.P. 156–158° C. (0.6 mm.); M.P. 52–53° C.; $[\alpha]_D^{23}$ +25.8° in ethanol (1.297 g./100 ml.). The hydrochloride is obtained by reacting the free base with hydrogen chloride in ethanol; M.P. 149.5–150° C.; $[\alpha]_D^{23}+10.1°$ in ethanol (0.992 g./100 ml.).

I claim:
1. A member of the class consisting of compounds of the formula

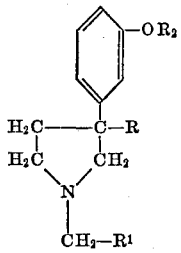

and salts thereof; where R is an alkyl radical containing from 1 to 5 carbon atoms inclusive; $R^1$ is a member of the class consisting of alkenyl, ω-chloroalkenyl, and ω,ω-dichloroalkenyl radicals containing from 2 to 5 carbon atoms inclusive; and $R^2$ is a member of the class consisting of hydrogen and groups of the formula

where Y is a member of the class consisting of lower alkyl, cyclopropyl, and cyclobutyl.

2. A compound according to claim 1 which is m-(1-allyl-3-isobutyl-3-pyrrolidinyl)phenol.

3. A compound according to claim 2 in the form of the levorotatory isomer, substantialy free of the dextrorotatory isomer.

4. A compound according to claim 1 which is m-(1-allyl-3-isobutyl-3-pyrrolidinyl)phenol hydrochloride.

5. A compound according to claim 4 in the form of the levorotatory isomer, substantially free of the dextrorotatory isomer.

6. A compound according to claim 1 which is m-(1-allyl-3-neopentyl-3-pyrrolidinyl)phenol.

References Cited

UNITED STATES PATENTS 3,127,415   3/1964   Wu et al. _____ 260—326.5

ALEX MAZEL, Primary Examiner

J. A. NARCAVAGE, Assistant Examiner

U.S. Cl. X.R.

260—326.3, 326.5 J, 465 F; 424—274